(No Model.)

9 Sheets—Sheet 1.

A. D. MAJOR.
MACHINE FOR MAKING AND CARDING HOOKS AND EYES.

No. 525,914.  Patented Sept. 11, 1894.

Witnesses
W. C. Coolee
Martin H. Olsen

Inventor
Albert D. Major
By Coburn & Thacher
Attys.

(No Model.) 9 Sheets—Sheet 2.
A. D. MAJOR.
MACHINE FOR MAKING AND CARDING HOOKS AND EYES.
No. 525,914. Patented Sept. 11, 1894.
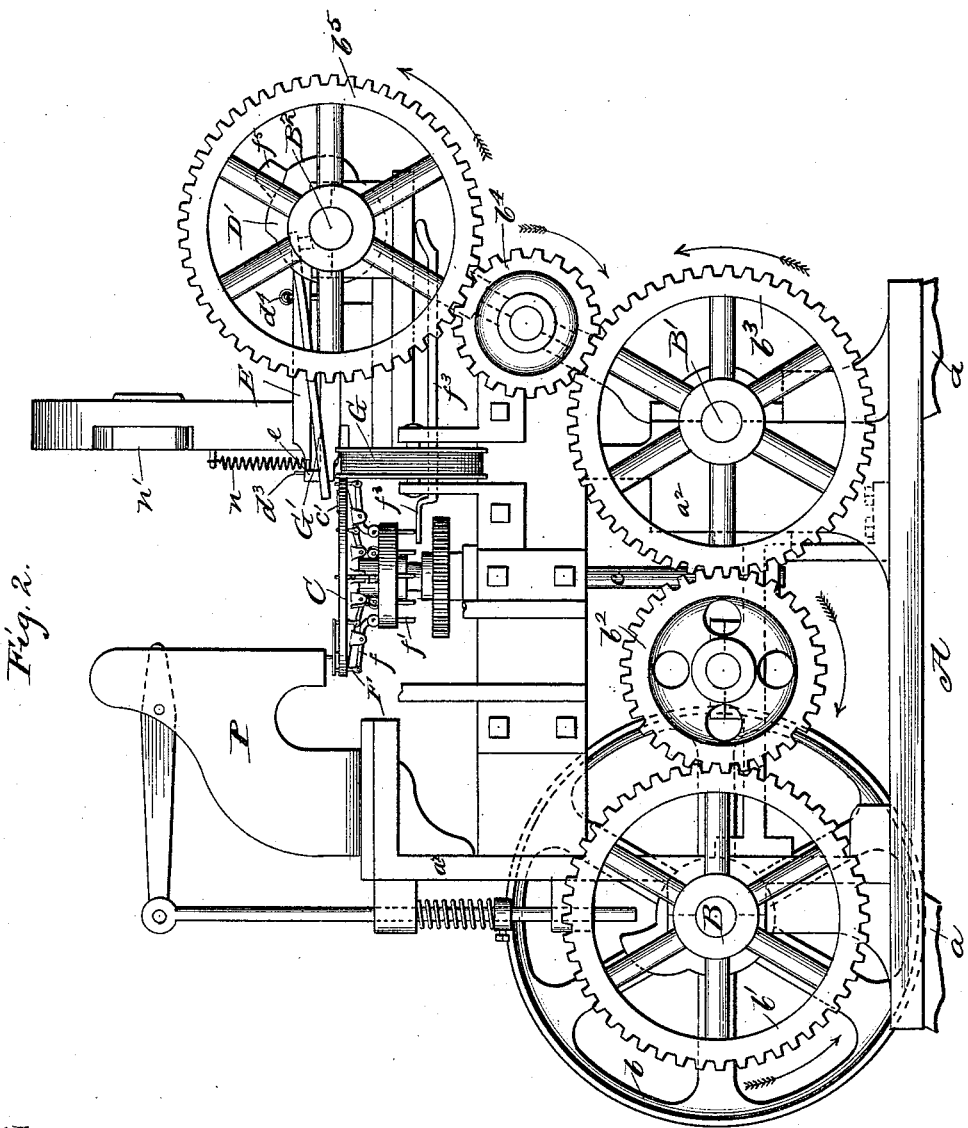
Witnesses
W. C. Coolico
Martin H. Olsen
Inventor
Albert D. Major.
By Coburn & Thacher
Atty's

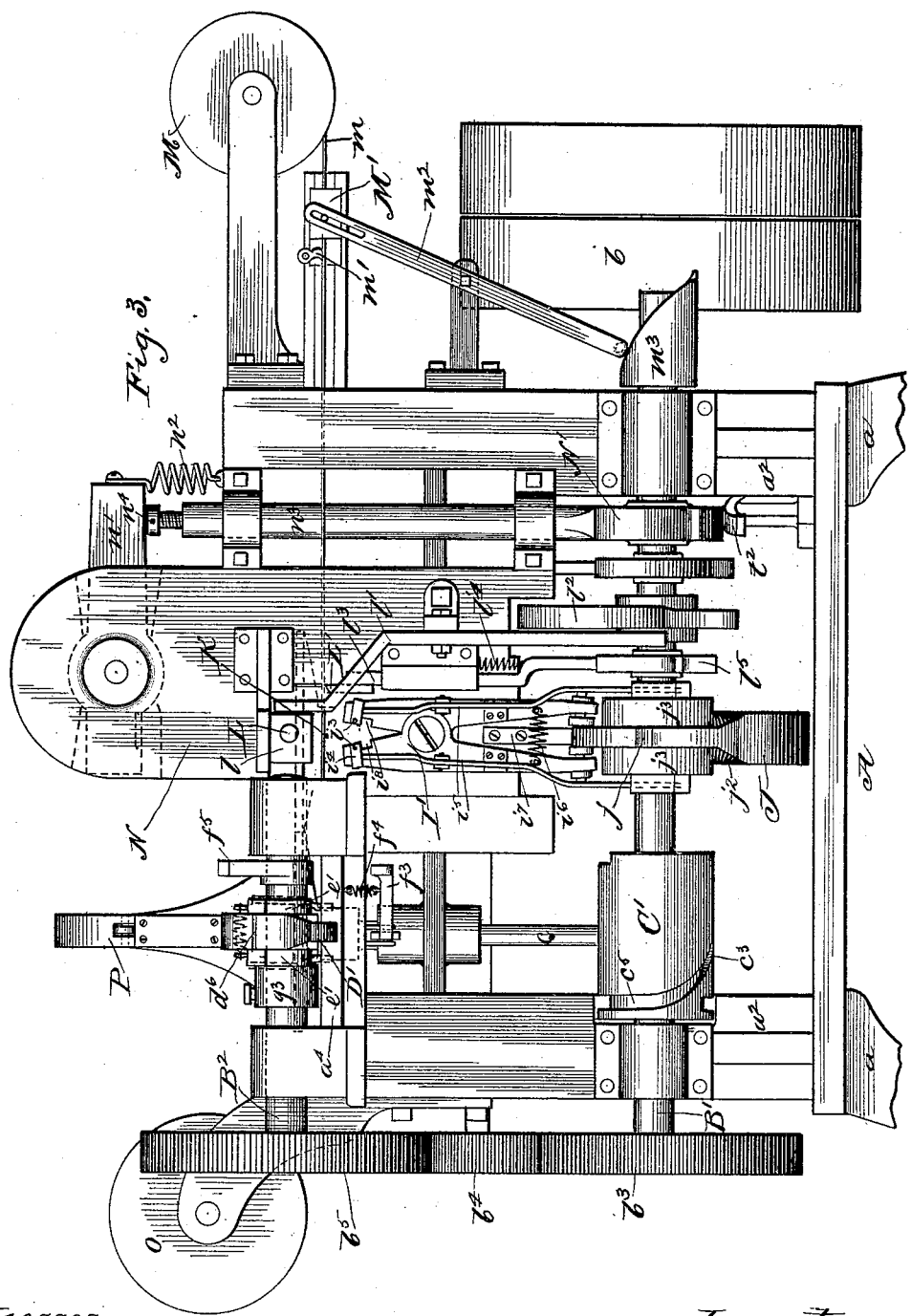

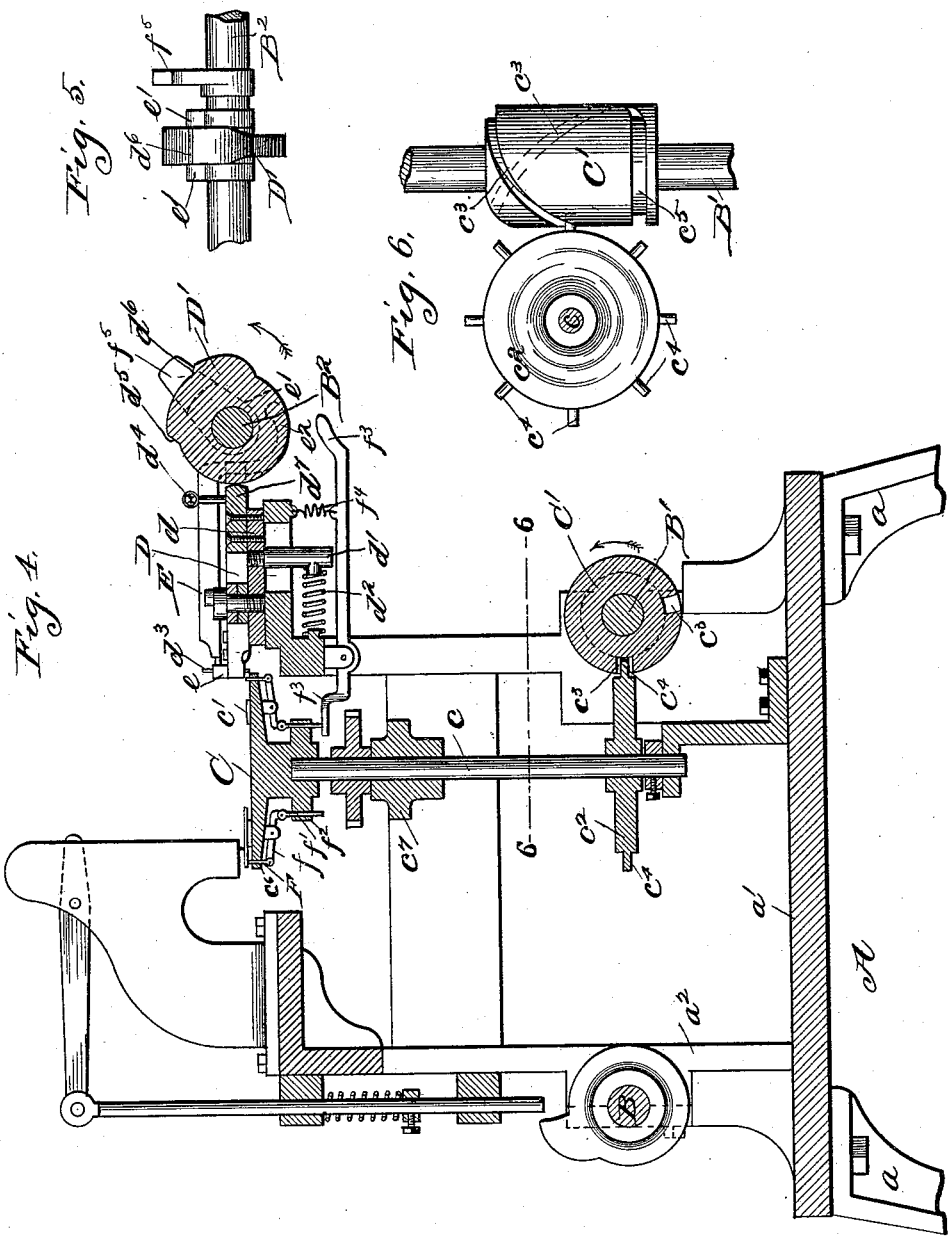

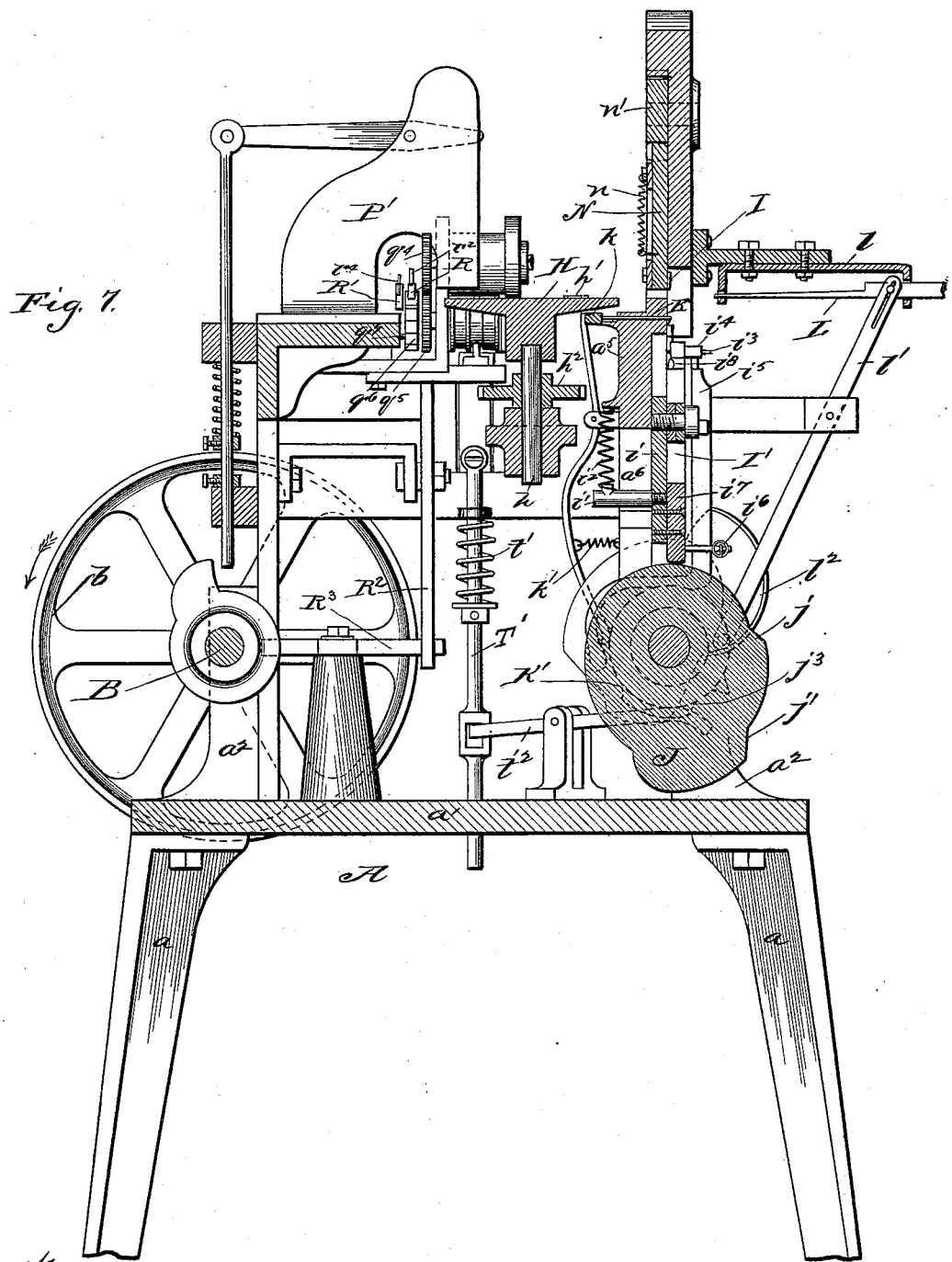

(No Model.) 9 Sheets—Sheet 6.

A. D. MAJOR.
MACHINE FOR MAKING AND CARDING HOOKS AND EYES.

No. 525,914. Patented Sept. 11, 1894.

Witnesses
W. C. Coolies
Martin H. Olsen.

Inventor
Albert D. Major
By Coburn & Thacher
Attys.

(No Model.) 9 Sheets—Sheet 7.
A. D. MAJOR.
MACHINE FOR MAKING AND CARDING HOOKS AND EYES.
No. 525,914. Patented Sept. 11, 1894.
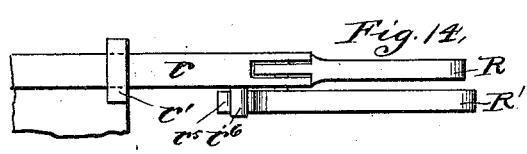
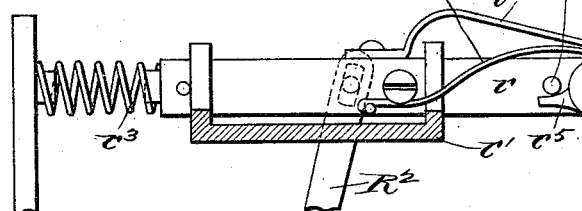
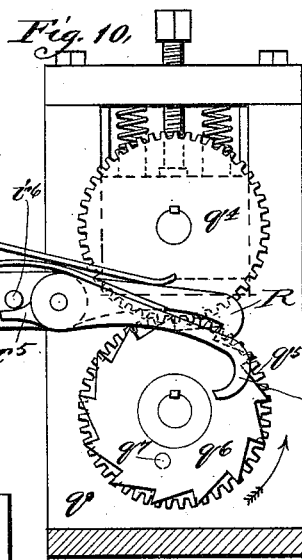
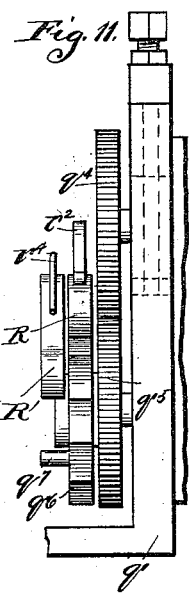
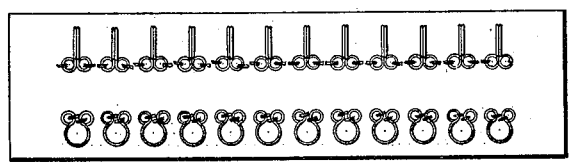
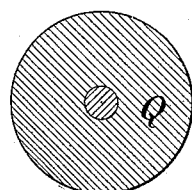
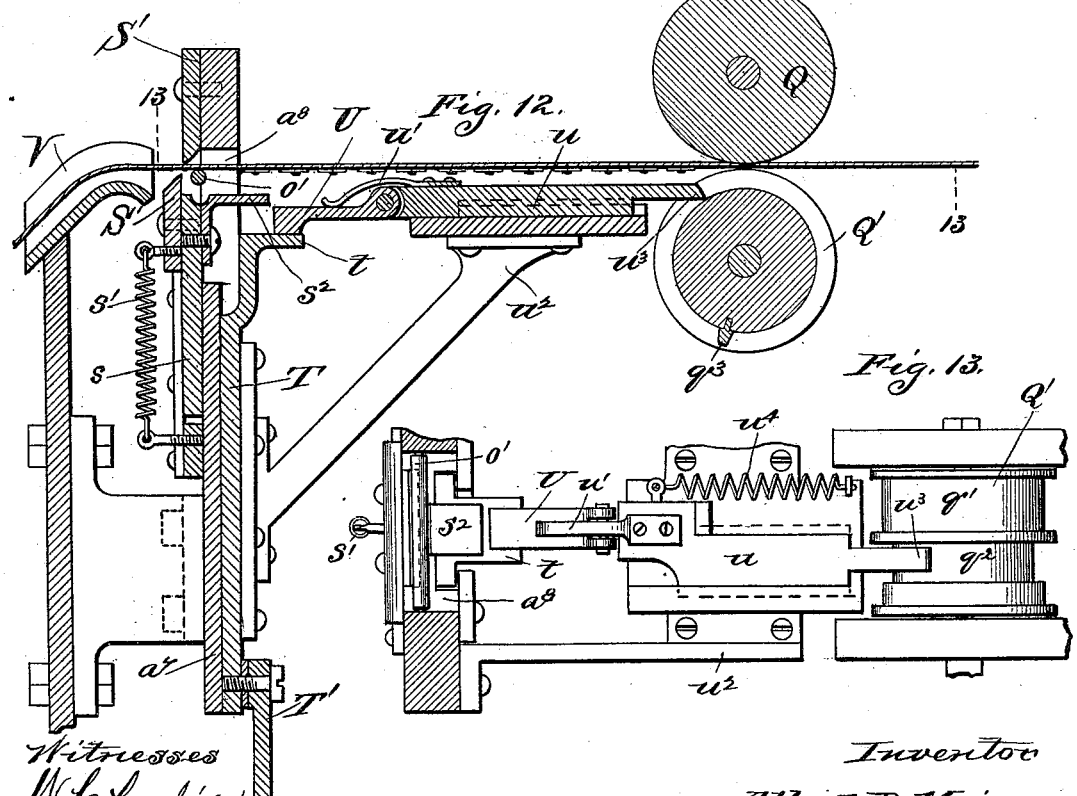
Witnesses
W. C. Corlies
Martin H. Olsen
Inventor
Albert D. Major
By Coburn & Thacher
Attys
THE NORRIS PETERS CO., PHOTO-LITHO., WASHINGTON, D. C.

(No Model.) 9 Sheets—Sheet 8.
A. D. MAJOR.
MACHINE FOR MAKING AND CARDING HOOKS AND EYES.
No. 525,914. Patented Sept. 11, 1894.
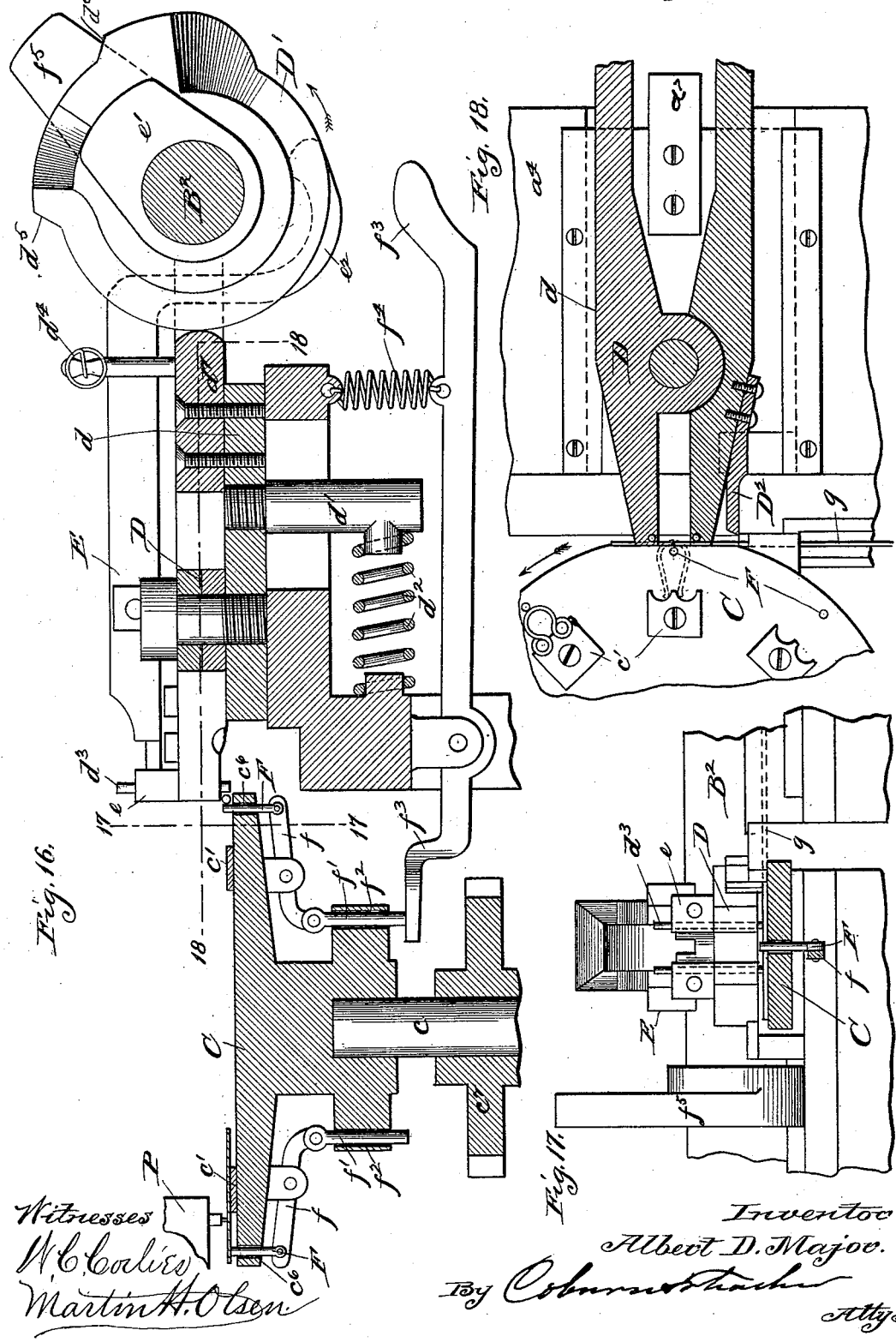

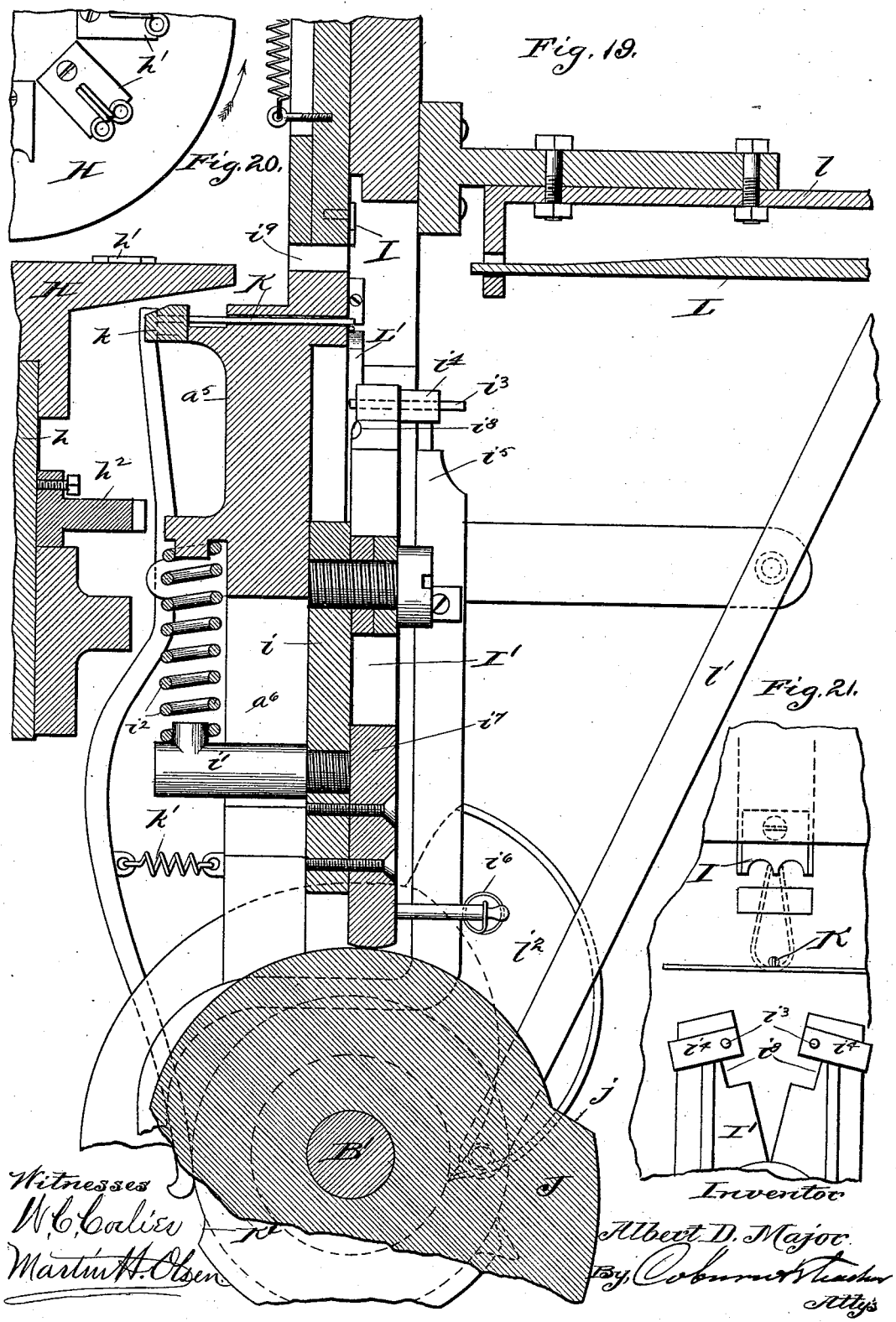

UNITED STATES PATENT OFFICE.

ALBERT D. MAJOR, OF DETROIT, MICHIGAN.

MACHINE FOR MAKING AND CARDING HOOKS AND EYES.

SPECIFICATION forming part of Letters Patent No. 525,914, dated September 11, 1894.

Application filed July 13, 1893. Serial No. 399,368. (No model.)

*To all whom it may concern:*

Be it known that I, ALBERT D. MAJOR, a citizen of the United States, and residing at Detroit, in the county of Wayne and State of Michigan, have invented certain new and useful Improvements in Machines for Making and Carding Hooks and Eyes, which are fully set forth in the following specification, reference being had to the accompanying drawings, in which—

Figure 1:
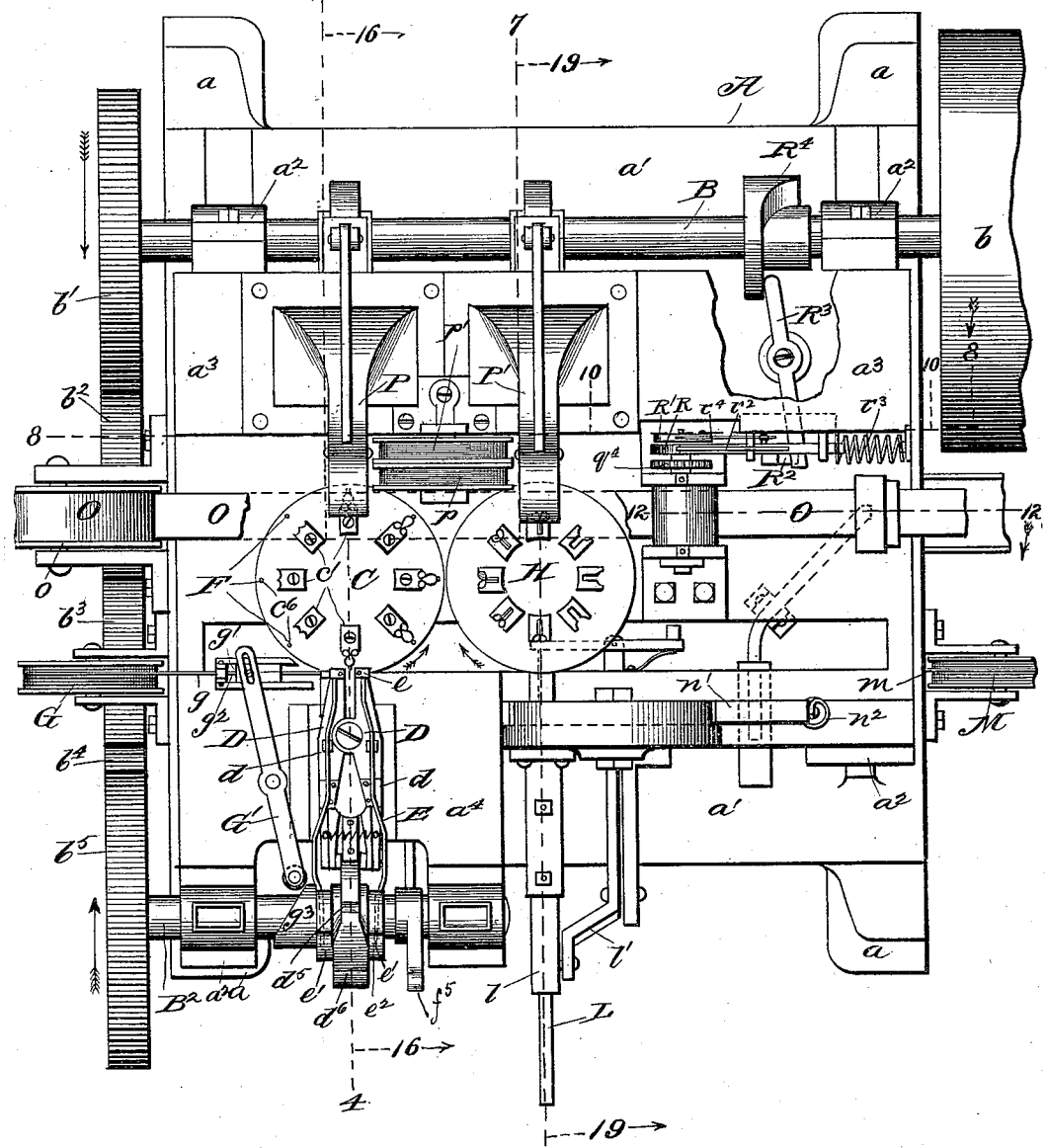
Figure 8:
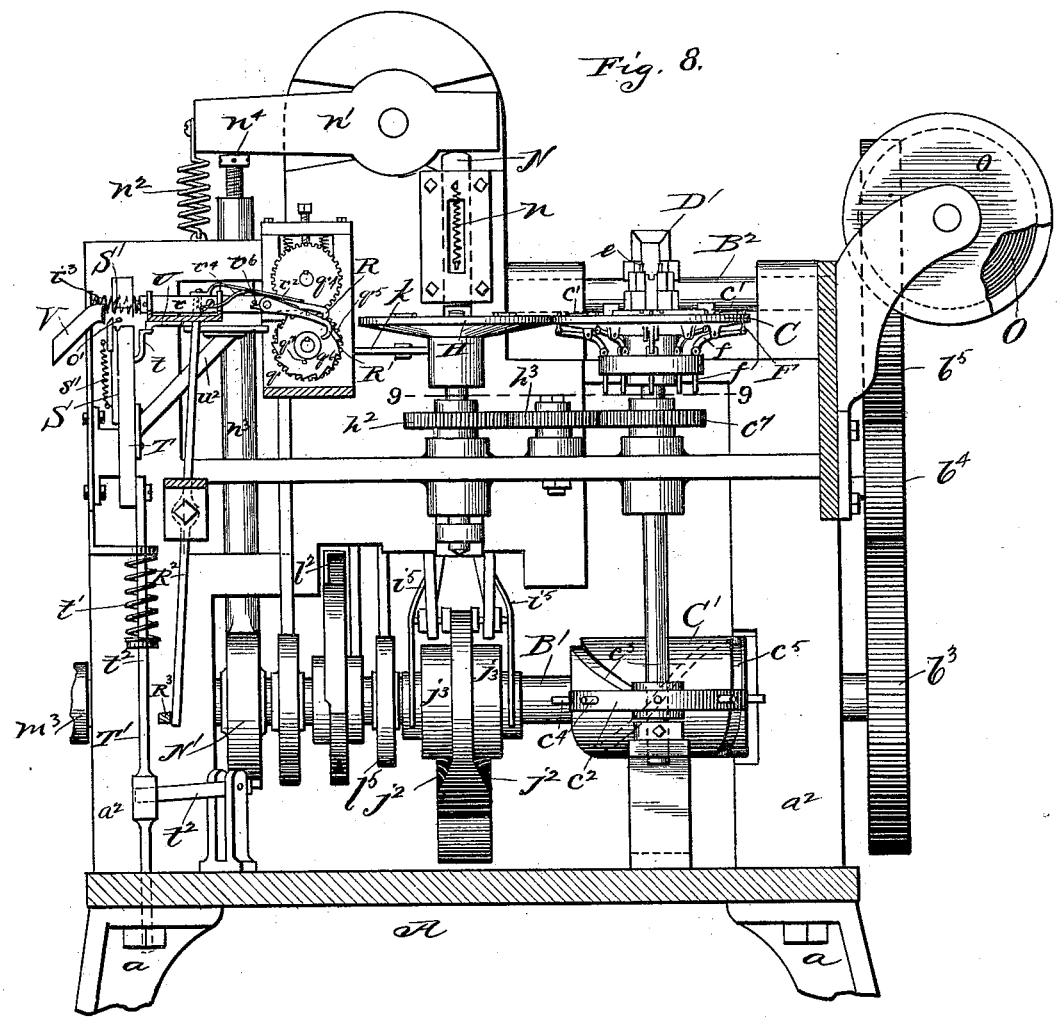
Figure 9:
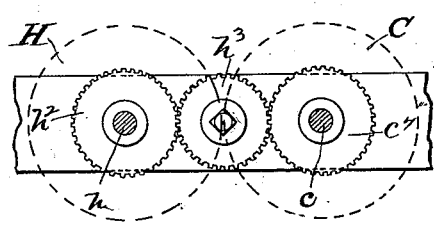

Figure 1 represents a plan view of a machine embodying my improvements; Fig. 2, a front side elevation of the same; Fig. 3, an end elevation of the same on the right hand with reference to Figs. 1 and 2; Fig. 4, a detail section, taken on the line 4, 4, of Fig. 1; Fig. 5, a detail elevation of the cams in Fig. 4 for operating the eyelet jaws; Fig. 6, a detail plan section, taken on the line 6, 6, of Fig. 4; Fig 7, a vertical section, taken on the line 7, 7, of Fig. 1; Fig. 8, a vertical section, taken on the line 8, 8, of Fig. 1, looking from the left; Fig. 9, a detail plan section, taken on the line 9, 9, of Fig. 8; Fig. 10, a detail side elevation of the feed mechanism for the strap carrier, taken on the line 10, 10, of Fig. 1, looking from the left; Fig. 11, an end elevation of Fig. 10; Fig. 12, a detail vertical section, showing the feed rollers, &c., taken on the line 12, 12, of Fig. 1, looking from the left; Fig. 13, a detail plan section, taken on the line 13, 13, of Fig. 12; Fig. 14, a detail plan of the operating levers in Fig. 10, detached; Fig. 15, a plan showing a section of a finished card after the hooks and eyes are attached to the card; Fig. 16, a detail section on the same line as Fig. 4, but showing only a part of the latter figure; Fig. 17, a detail section, taken on the line 17, 17, of Fig. 16; Fig. 18, a detail plan section, taken on the line 18, 18, of Fig. 17; Fig. 19, a detail section, taken on the same line as Fig. 7, but extending only to show the hook mechanism; Fig. 20, a detail plan showing a section of the hook carrying disk; and Fig. 21, a detail elevation of a portion of Fig. 19, looking from the right showing the hook formers. Figs. 1 to 9, inclusive, are on the same scale; and the remaining figures are on the same scale substantially, but considerably enlarged from that of the former.

Heretofore in the manufacture of hooks and eyes and preparing them for the market, the hooks have been made on one machine, the eyes upon another, and then they have been prepared for the market by sewing them to cards by hand.

It is the object of my invention to do away with the hand work in attaching the manufactured product to cards or flexible bases as is the common practice and to provide means whereby, as said hooks and eyes, or hooks or eyes, are made, they will be automatically attached to the flexible base or card board.

The invention consists, therefore, in the combination of hook forming devices, eye forming devices and carding devices by mechanisms, whereby they are all organized in one machine and operated by the same common drive shaft, as will be hereinafter described.

I will now proceed to describe in detail a complete machine in which I have carried out my invention in one practical way and will then point out more definitely in claims the improvements which I believe to be new and wish to secure by Letters Patent.

In the drawings the entire mechanism is shown mounted in an upright supporting frame, A, which is substantially of rectangular form and set up on legs, $a$, which directly support the bed, $a'$, from which rise corner posts, $a^2$, carrying an upper rectangular frame, $a^3$. The particular construction of this frame is, however, immaterial, provided only that it is adapted for the proper mounting of the several mechanisms and devices required for the operations to be performed by this machine. A shaft, B, is mounted in the lower part of this frame at one side thereof which is the main driving shaft of the machine, being in this instance shown as provided with a band driving pulley, $b$, at one end, while at the other end it carries a gear-wheel, $b'$.

I will first describe the mechanism for making eyes and fastening them to the card strip, so far as is necessary to an understanding of the same. A horizontal disk, C, is set upon the upper end of an upright shaft, $c$, which is set in suitable bearings in the main frame to support it in its upright position and at the same time permit its free revolution. Upon the upper face of this disk is arranged a series of dies, $c'$. These dies are constructed to form the circles in the eyes, being provided with circular recesses in their faces for this purpose. They are arranged radially upon the face of the disk to which they are fastened, as seen in Fig. 1. Suitable mechanism is provided for giving to this disk a step-by-step motion, whereby the said dies are brought successively to the required position in front of the bending devices. Any mechanism adapted to this purpose may be applied for imparting this intermittent rotary movement to the disk. In the drawings these devices consist of a pin-wheel, $c^2$, fastened to the lower end of the shaft and the required movement is given to this wheel by means of a rotary cam, C', provided with two cam grooves, $c^3$, which engage successively with the pins, $c^4$, of the wheel, thereby moving the wheel forward two steps with each single revolution of the cam. Straight or circumferential grooves, $c^5$, in the cam hold the pins stationary at the required point and have the required operation of forming an eye. The cam C' is secured to a shaft, B', mounted in the main frame at the side of the machine opposite to the main shaft and receiving motion from the latter by means of a transmitting gear, $b^2$, which engages with the gear-wheel $b'$ on the main shaft, and a similar gear-wheel, $b^3$, on the end of the shaft B', as seen in Fig. 2. A short shaft, $B^2$, is mounted in the upper part of the frame, above the shaft B' and a little outside thereof, as seen in Fig. 2. This shaft receives rotary motion from the shaft through a transmitting wheel, $b^4$, which engages with the gear-wheel, $b^3$ and a similar wheel, $b^5$, on the end of this latter shaft. On the upper flat portion of the frame, which may be called its upper bed, the devices for bending the wire into the respective dies to form the eyes are mounted, being arranged between the shaft $B^2$ and the die carrying disk C. The bending jaws, D, are mounted on a slide, $d$, by means of a pin on which the jaws work as a pivot. The slide rests on the upper bed, $a^4$, within suitable guide ways which permit a reciprocal motion of the slide, and an arm, $d'$, depends from the slide through a slot in the bed and to its lower end is applied a spring, $d^2$, which is compressed as the slide is moved forward toward the disk and so acts as a retracting spring whenever the slide is relieved from the force which moves it forward. Each jaw is provided with the usual pins, $d^3$, projecting slightly from the under side of the inner end thereof. A spring, $d^4$, connects the outer ends of the jaws, which normally acts to hold the inner ends open. A circular disk cam, D', is fastened on the shaft $B^2$, being arranged to extend in toward the outer ends of the jaws, as seen in Figs. 1 and 16. The disk is provided with cam projections $d^5$, and $d^6$, upon its periphery, the latter projecting out beyond the former somewhat, as seen in Fig. 16. A stop arm, $d^7$, is fastened to the outer end of the slide and arranged in the plane of the disk cam, so that the latter will act upon the outer end of the arm. When this stop arm is in contact with the circular portion of the disk, as seen in Fig. 16, the jaws are in their outward or inoperative position, but as the disk is revolved, the two cam projections come respectively into contact with the arm, thereby driving the slide inward first a certain distance and then still farther by the action of the second cam. The second cam projection $d^6$ is also enlarged, laterally, as compared with the first, this enlargement being gradually by sloping slides or inclines outward from the sides of the cam $d^5$, as seen in Fig. 1. The outer ends of the jaws have contact with the respective sides of these cams. Lifting levers, E, are pivoted to the upper side of each jaw, their inner ends engaging with blocks, $e$, to which the pins $d^3$ are fastened, these pins being set loosely in the jaws to provide for vertical movement. The outer ends of these lifting levers are bent downward and outward underneath the shaft $B^2$ and on the latter are cams $e'$, one on each side of the cam disk and adapted to engage with the respective outer bent ends, $e^2$, of the levers, thus providing for depressing the levers at the proper time to lift the pins. A series of pins, F, is set loosely in the disk C passing up from underneath the latter through holes, $c^6$, therein in which they are free to move vertically, these holes being arranged near the edge of the disk and one in front of each of the dies thereon. A series of short levers, $f$, is pivoted to short lugs depending from the under side of the disk C. Each of these levers is connected at its outer end to the lower end of one of the said pins and at its inner end to a second pin, $f'$, which is arranged to slide vertically in suitable holes, $f^2$, passing through an enlargement of the disk hub. A lever, $f^3$, is pivoted to the frame below the sliding jaws and arranged so that its inner end extends directly underneath one of the pins $f'$ when the disk is at rest in position before the bending jaws. The outer end of this lever extends outward underneath the shaft $B^2$ and is held up in normal position by a spring, $f^4$. On the shaft $B^2$ at one side of the cams, mentioned above, there is fastened an arm or cam, $f^5$, which is arranged and adapted to engage the outer end of the lever $f^3$ and depress it with each revolution of the said shaft. A knife or cutter, $D^2$, is fastened to the outside of the outer jaw and extends inward to a line with the pin in said jaw, as seen in Fig. 18. The driving devices are constructed relatively so that the eye disk C will stop at each movement directly in front of the bending jaws, as seen in Figs. 1 and 18. A spool of wire, G, is mounted at the front of the frame in such position that the wire, $g$, thereon may be drawn in directly therefrom, immediately in front of the pins on the jaws on the outside thereof and one of the pins in the disk on the other side. A device for feeding this wire in at suitable intervals is, of course, required. I have shown in the drawings the ordinary clamp feed which consists of a lever, G', pivoted to the frame, and connected at its inner end to the clamp box or slide, $g'$, through which the wire passes and which is provided with a small swinging clamp, $g^2$, which binds the wire on the inward movement of the box and so feeds it into the machine, while on the outward movement thereof it swings free from the wire. This clamp is a small pivoted dog or eccentric, the eccentric being arranged so that on the inward movement the clamp will be drawn down upon the wire by the said movement of the box, while on the outward movement it will swing back from the wire by contact therewith to permit the free return movement or stroke of the feed box. The required vibrations are given to this feed lever by means of a cam, $g^3$, on the shaft $B^2$, which is arranged to engage the outer end of the lever, as seen in Fig. 1. A disk, H, is arranged within the same horizontal plane as the disk C and just inside the latter, as shown in Fig. 1, the disk being mounted on an upright shaft, $h$, parallel to the shaft $c$, and mounted in suitable bearings on the frame. A series of dies, $h'$, is secured to the upper face of this disk, these dies being receiving dies adapted to receive the hooks when finished. They are arranged radially on the face of the disk, the same as the eye dies on the disk C. The shaft $h$ is also provided with a small gear-wheel, $h^2$, by means of which an intermittent motion is transmitted to this shaft from the shaft of the disk C through the medium of a transmitting gear, $h^3$, which engages with the said wheel and also with a similar gear-wheel, $c^7$, on the shaft $c$, as seen in Figs. 8 and 9.

The devices for forming the hooks are mounted on an upright, $a^5$, of the main frame which stands just at one side of the hook disk. The dies, I, are very similar to those just described for forming the eyes, but they are arranged vertically instead of horizontally as in the former case. The bending jaws, I', are, in general construction, the same as the jaws D and in like manner are fastened to a slide, $i$, by a pin on which they pivot, this slide having a movement vertically between suitable guide ways on the said post. The slide is also provided with an arm, $i'$, extending horizontally through a slot, $a^6$, in the post and receiving one end of a retracting spring, $i^2$, which operates normally to hold the slide downward. The bending pins, $i^3$, in the jaws, their blocks, $i^4$, and operating levers, $i^5$, are the same as in the former mechanism, the outer ends of the levers being also bent as in the former instance, and the jaws being provided with a spring, $i^6$, which operates to open them. An arm, $i^7$, is fastened to the lower end of the slide for contact with the operating cams. Each jaw is provided at its inner face with a recess, $i^8$, as seen in Fig. 21, located just back of the bending pins and arranged so that when the jaws are closed the two recesses will form a rectangular slot through the jaws. In the upright $a^5$, there is also provided a slot, $i^9$, extending through toward the disk H, having its bottom on a level with the face of said disk and corresponding to the said slot formed, as described in the jaws when closed. The devices for operating these sliding jaws are the same as in the case already described, and consists of a cam disk, J, fixed upon the shaft B' and provided with peripheral cam projections $j$, and $j'$, and lateral extensions, $j^2$, arranged to operate upon the jaws the same as described above; and also cams, $j^3$, on the shaft at each side of the cam J for operating the pin levers on the jaws. The pin, K, around which the wire is first bent in forming a hook, is set horizontally in the upright at a suitable point and is free to slide back and forth in its support. At its outer end it is connected to the end of a lever, $k$, also pivoted to the upright, which is provided with a spring, $k'$, arranged to act upon the outer end of the lever to normally retract the pin. A cam, K', is fixed on the shaft B' in a position to operate this lever at the proper moment to thrust the pin forward into working position. A punch bar, L, is mounted in a horizontal position in a bracket, $l$, fastened to the frame immediately outside of, opposite to and in line with the slot $i^9$ in the upright. This bar is free to slide back and forth in its support into and out of the said slot. It is operated by means of a pivoted lever, $l'$, connected at its upper end by any suitable joint to the punch and at its lower end brought into contact with a suitable operating cam, $l^2$, also fixed on the shaft B'. A cutter, L', is mounted on a sliding-bar, $l^3$, arranged to slide vertically and in a position to cut the hook wire at suitable intervals. This bar is provided with a suitable retracting spring, $l^4$, and is operated at the proper moment for cutting by a suitable cam, $l^5$, fixed on the shaft B'. The spool or wire, M, for the hooks is mounted at the back side of the frame and in such position that the wire, $m$, may be drawn in directly and horizontally in a line just underneath the pin K, as seen in Fig. 19. This wire is fed in at intervals by a device similar to that already described, consisting of a clamp block, M', through which the wire runs and which is provided with a swinging clamp or dog, $m'$. The upper end of a pivoted lever, $m^2$, is connected to this sliding box, while its lower end is brought into contact with the surface of a suitable actuating cam, $m^3$, fixed on the shaft B' and arranged to vibrate the lever at intervals, so as to provide a suitable itermittent feed for the wire. In the upright $a^5$, just above the cross-slot therein, is set a plunger, N, which is provided with a spring, $n$, adapted to hold the plunger up above the slot. There is also mounted in the upright a pivoted lever, $n'$, the inner end of which passes up over the upper end of the plunger, while the outer end is held down by a suitable spring, $n^2$. A vertically sliding rod, $n^3$, is mounted in suitable guides just underneath the outer end of the lever and a suitable cam, N', is fixed on the shaft B' for the purpose of thrusting this rod upward at certain intervals, thus vibrating the lever and depressing the plunger. The upper end of the sliding rod is provided with an independent cap or head, $n^4$, set in the end of the rod by a screw thread, so as to be adjustable for the purpose of accurately regulating the throw of the lever. A paper strip, O, is wound upon a suitable spool, o, mounted at the front of the table somewhat inside the spool of eye wire or to the left thereof, speaking with reference to Fig. 1 of the drawings. This strip is paper board or any suitable fibrous material and width for carding hooks and eyes and then cutting up into cards of convenient size. This strip is fed into the machine horizontally by suitable mechanism directly over the inner edges of the two disks C and H, or the left hand edges of said disks, as represented in Fig. 1. The strip, therefore, passes directly over the eye dies on the one disk and the hook dies on the other and so that the eye in the outermost die at this edge of the disk, when at rest, will stand at the outer or left hand edge of the strip, while the corresponding hook on the disk H, will stand at the inner or right hand edge of the strip, as seen in Fig. 1, the dies on the die disk H being arranged upon a smaller circle than those on the disk C for this purpose. When the disks are brought to a position of rest, there will be a die with an eye and a die with a hook in this position each directly opposite the respective forming points and lying directly underneath the strip and ready for attachment thereto. An ordinary wire stapling device, P, is mounted on the upper bed of the frame in suitable position to fasten the eye in the position described above to the card by the ordinary mode of stapling with wire; and a like stapling device, P', is mounted in line with the former and arranged in position to fasten to the card in a similar way the hook on the disk H in the position thereon just described. A spool of suitable stapling wire, p, furnishes wire to the first device and a similar spool, p', to the second. These stapling devices are such as are in ordinary use and their construction being well-known requires no further description here.

The following is the mechanism for feeding the paper strip through the machine: Two feed rollers Q and Q' are mounted in suitable upright brackets, q, on the upper part of the machine and toward the rear side of the frame beyond the disk H. The upper roller Q is plain, while the lower one Q' is provided with the grooves, $q'$, $q^2$, to accommodate the hooks and eyes on the under side of the card. In the hook groove, $q^2$, there rises at one point a short cam projection, $q^3$, as seen in Fig. 12. The shafts of the rollers, at one end outside of the brackets, are provided, respectively, with gear-wheels, $q^4$, $q^5$, meshing with each other and a lower shaft is also provided with a ratchet-wheel, $q^6$, which also has on its outer face a short pin, $q^7$. A pawl, R, is pivoted to the inner end of a sliding bar, r, mounted in a suitable bracket, r', fastened to the top of the frame. A spring, $r^2$, is arranged to act on the pawl to press it downward and arranged so that the latter will engage with the teeth of the ratchet. A coiled spring, $r^3$, is arranged back of the pawl bar and operates normally to push the latter forward. A second pawl, R', is also pivoted to the bar by the same pivot pin, but is arranged on the side of the bar, as seen in Fig. 14. The hook of this pawl is somewhat longer than that of the first pawl named and in normal position it drops down by the side of the ratchet wheel, as seen in Fig. 10, being provided also with a spring, $r^4$, which operates to depress it. In rear of its pivot this second pawl is provided with a tail piece, $r^5$, which acts against a stop pin, $r^6$, on the side of the bar to limit the downward movement of the pawl. A vertical lever, $R^2$, is pivoted to the supporting frame and connected at its upper end to the sliding pawl bar, while at its lower end it is brought into contact at one side with the outer end of a short horizontal lever, $R^3$, the other end of which is brought into contact with an operating cam, $R^4$, on the main shaft, which cam is adapted to give an intermittent vibration to the said lever and so operate the feed mechanism. The devices for cutting the strip into suitable cards is mounted on an upright, $a^7$, of the frame at the back of the machine. This upright rises somewhat above the upper bed of the frame, as seen in Fig. 12, and has a slot, $a^8$, through it for the passage of the strip, in which slot is mounted a small roller, o', for the support of the strip. A vertically sliding cutter, S, is mounted on the outside of the upright below the strip and a stationary cutter, S', against which the former acts, is fastened to the upper end of the upright just above the strip, as seen in Fig. 12. The slide bar, s, to which the movable cutter is fastened is provided with a retracting spring, s', fastened at its upper end to a pin on the slide and at its lower end to a pin fastened to the upright, so that the spring will act to pull the slide bar downward. At the upper end of the slide bar there is a toe-piece, $s^2$, extending at right angles inward. On the back or inner side of the upright is mounted a second slide bar, T, the upper end of which is bent inward at right angles to form a kind of flat head, t, and is arranged underneath the toe-piece of the cutter slide, as seen in Fig. 12. To the lower end of the slide T is attached the upper end of a push rod, T', mounted in suitable guides and provided with a retracting spring, t', which operates to pull it downward. A pivoted lever, $t^2$, is connected at one end with this push rod, while the other end is extended outward and brought into contact with the cam N', which operates this lever as well as the lever for the plunger N. In the normal action of this slide bar T it does not rise high enough to strike the toe on the cutter bar and hence will not operate the latter. In order to actuate the cutter at the proper time, I provide a plug-bar, U, hinged at one end to a horizontal slide, $u$, and at its other end resting on the head at the upper end of the bar T, being provided with a depressing spring, $u'$. The slide $u$ is mounted on a bracket-support, $u^2$, fastened to the upright $a^7$. The inner end of this slide terminates in a kind of finger, $u^3$, which extends inward into the groove $q^2$, so as to stand in the path of the little cam $q^3$. It will be seen then that with each revolution of the feed rollers this cam will come in contact with the said slide and so will push the plug outward into the space between the head of the slide bar and the toe on the cutter bar, filling this space and, therefore, the next upward movement of the slide bar will raise the cutter and sever the strip. The slide $u$ is also provided with a retracting spring, $u^4$, operating to bring it back after being released from the forward thrust of the cam. An inclined chute, V, is mounted on the outside support also fastened to the upright $a^7$ over which the severed card of hooks and eyes drops.

The operation of this machine is as follows, power being applied to the main driving shaft by which all the different parts of the machine are operated as will appear from the description above. At the proper moment wire is drawn in from the spool G by one movement of the feed mechanism sufficient to form one eye and brought into position at the edge of the disk C in front of the pins of the bending jaws. These jaws are then moved forward and the wire instantly cut just in advance of the bending. An eye is then bent and formed in the die by the operation of the bending devices which have been described. In this operation the first forward movement of the jaws brings the pin in their forward ends against the ends of the wire and carries them around the pin in the disk, thus bending or doubling the wire upon itself and bringing the ends of the wire close to the recesses in the die. The pin in the disk is then withdrawn by the depression of the lever $f^3$, as explained, and the jaws moved forward again forcing the wire forward and bending the ends thereof in the recesses of the die to form about half of the circles. The pins in the jaws are then withdrawn and another forward movement of the latter is made carrying the bent wire forward into the die and completely forming the respective circles of the eye. The closing of the jaws draws the two wires close together to form the central portion of the eye. The eye is left on the disk in the die and the disk is at once moved forward one step, the pin springing up behind the eye as soon as the jaws are retracted, as seen in Fig. 18 of the drawings. Simultaneously a hook is formed and deposited upon the disk H by the mechanism described above. The wire is fed in from the spool M the same as in the former case and into the required position above the bending jaws and below the sliding pin, as seen in Fig. 19. The jaws are then moved forward, the wire being cut instantly and the severed piece is bent up around the sliding pin. The latter is at once withdrawn and the further action of the jaws pushes the wire up into the forming die above, thus forming the eyes of the hooks in the same way as already described with the same parts of the eyes. The punch bar then moves forward and doubles the bent wire into the slot in the uprights and rests a moment when the plunger N is forced down and flattens the end of the hook slightly between it and the punch below. The latter then receives a second forward motion, thereby driving the completed hook through the slot and into the receiving die on the disk H immediately in front of the slot. The parts are constructed and arranged so as to form and place one hook upon the disk H during the formation of each eye upon the disk C. As the shafts of the two disks are geared together, as explained, their movements are regular and coincident and as the dies on each are filled up one by one at length a filled die on each will be brought around directly opposite to the carding point and will be stopped directly underneath the paper tape. Simultaneously the two stapling mechanisms are brought at once into action fastening an eye and a hook to the under side of the tape at one and the same time. The feed of the tape is intermittent, effected by the turning of the feed rollers one notch on the ratchet wheel. The tape of paper will thus be filled with hooks and eyes fastened thereto by wire staples and in position as shown in Fig. 15. The filled tape is fed along through the rollers to the cutter which obviously is brought into action only with one revolution of the feed rollers. The filled strip is cut off in cards containing one dozen hooks and eyes. To accomplish this the ratchet wheel of the feed rollers is provided with thirteen teeth. The ordinary feed, by means of the main pawl R moves the strip twelve steps when it is ready to be severed, but in order to provide a stop between the cards at the point of severing, the supplementary pawl R' is brought into operation at this point by the pin on the ratchet wheel passing in under it and the pawl engaging therewith and so giving the ratchet a movement forward one notch more. The operating devices, are, of course, all arranged and timed so that the several periods of movement and rest required for the harmonious action of this machine will occur simultaneously.

It will thus be seen that I obtain a single machine upon which the entire work of making hooks and eyes and attaching them to a strip of paper board which is then cut up into cards of the required size, is performed on a single machine, the entire machinery required for this purpose being driven from a single main shaft. I am also able to use wire completely prepared so that the hooks and eyes will be entirely finished articles, requiring no further treatment.

I am aware that hooks and eyes have been heretofore made by machinery, but so far as I know the hooks have been made on one machine, and the eyes on another, thus requiring two separate machines. These articles have been heretofore carded by hand by sewing them onto separate cards with a needle and thread. So far as I know the operation has never been performed by machinery. I believe, therefore, that I am the first to devise machinery for carding hooks and eyes and that I am also the first to produce a machine upon which the three operations of forming hooks, forming eyes and attaching them to a card strip are all performed upon one and the same machine, thus saving the delay and expense of transfers and securing substantial uniformity in the final product. I also believe that my devices for forming hooks and eyes and the mode of forming the small circles or eyes thereof are new with me.

In the general combination of mechanism for performing the three operations which I have mentioned above, there may be changes in the devices and others may be substituted for some of the particular means herein shown for making the hooks or the eyes, without destroying the general combination and in such combinations I do not wish to be understood as limiting myself to the special devices herein shown and described.

Having thus described my invention, what I claim as new, and desire to secure by Letters Patent, is—

1. In a machine for making and carding hooks and eyes, eye forming mechanism, in combination with transferring mechanism for carrying the finished eyes to a card strip, stapling mechanism for attaching the eyes to said strip, and feed mechanism for feeding said strip intermittently through the machine, substantially as described.

2. In a machine for making and carding hooks and eyes, hook forming mechanism, in combination with transferring mechanism for carrying the finished hooks to a card strip, stapling mechanism for attaching the hooks to said strip, and feed mechanism for feeding said strip intermittently through the machine, substantially as described.

3. In a machine for making and carding hooks and eyes, eye forming mechanism, in combination with hook forming mechanism, mechanism for transferring the finished hooks and eyes synchronously to a card strip, stapling devices for attaching the hooks and eyes to said strip, and a feeding mechanism, whereby said strip is given a step-by-step movement through the machine, substantially as described.

4. In a machine for making and carding hooks and eyes, eye forming mechanism, in combination with hook forming mechanism, mechanism for transferring the finished hooks and eyes synchronously to a card strip, stapling devices for attaching the hooks and eyes to said strip, a feeding mechanism whereby said strip is given a step-by-step movement through the machine, and a cutting device for severing the filled strip into suitable cards of hooks and eyes, substantially as described.

5. In a machine for making and carding hooks and eyes, a disk C, in combination with eye forming dies $c'$ secured radially upon the face thereof, bending and forming devices adapted to bend and form the wire into eyes in said dies respectively, intermittent feed mechanism for rotating the disk step-by-step, to carry the formed eyes to a suitable card strip, the disk being arranged to permit said card strip to pass over its edge opposite to the bending and forming devices and stapling devices for attaching the eyes to the under side of the card strip, substantially as described.

6. In a machine for making and carding hooks and eyes, a disk H, in combination with dies $h'$ adapted to receive finished hooks, secured radially to the face thereof, bending and forming devices adapted to bend and form the wire into hooks, the punch bar L adapted to give the last bend to the hooks and deliver them finished into the dies $h'$, intermittent feed mechanism for rotating the disk step-by-step, to carry the formed hooks to a suitable card strip, the disk being arranged to permit said strip to pass over its edge opposite to the bending and forming devices and stapling devices for attaching the hooks to the under side of the card strip, substantially as described.

7. In a machine for making and carding hooks and eyes, the disk C provided with eye forming dies $c'$ upon its face, in combination with the disk H, provided with hook-receiving and holding dies $h'$, gearing connecting the shafts of the two disks, eye forming mechanism adapted to bend and form the wire into eyes in the dies $c'$, hook forming mechanism adapted to bend and form the wire into completed hooks and deliver the same into the dies $h'$, intermittent mechanism for giving a step-by-step rotation to the said disks simultaneously to transfer the finished hooks and eyes to a suitable card, strip stapling devices P, P', for fastening said hooks and eyes to the card, feeding mechanism for giving the card strip an intermittent feed through the machine, and a cutting mechanism for severing the filled strip into suitable cards of hooks and eyes, substantially as described.

8. In a machine for making and carding hooks and eyes, the disk C, in combination with the eye dies $c'$ secured to its face, the vertically sliding pins F, arranged in front of said dies levers $f$, pins $f'$, actuating lever $f^3$, and the bending and forming jaws D, movable to and from said dies substantially as described.

9. In a machine for making and carding hooks and eyes, the upright $a^7$, provided with slot $a^8$, in combination with the intermittently rotating disk H arranged immediately in front of said slot and level therewith, the hook holding dies $h'$ on said disk, and the sliding punch bar L adapted to double the hook wires by forcing them through the slot and at the same time delivering the finished hook into the respective dies on the disk, substantially as described.

10. In a machine for making and carding hooks and eyes, the intermittently rotating disk C, in combination with eye forming dies $c'$, secured to its surface, pins F around which the eye wire is bent, arranged in front of said dies set vertically and movably in said disk, the short levers $f$, the sliding pins $f'$, the actuating lever $f^3$, retracting spring $f^4$ revolving cam $f^5$, and eye-bending and forming devices movable to and from the said eye dies substantially as described.

11. In a machine for making hooks and eyes, the eye die $c'$, in combination with a movable pin F, arranged in front of said die the sliding jaws D, arranged in front of said pin in line with the latter and the die $c'$ and provided with pins $d^3$, mechanism for moving the jaws forward a step and then moving them forward a second step and at the same time closing them, and mechanism for withdrawing the movable pin after the first movement of the said jaws, means for withdrawing the pins $d^3$ substantially as described.

12. The eye forming die $c'$, in combination with the movable pin F, arranged in front of said die, the jaws D, provided with pins $d^3$ and arranged in front of and in line with said pin and die, the slide $d$ on which said jaws are pivoted, and the revolving cam disk D' provided with the cam projections, $d^5$, $d^6$, substantially as described.

13. The eye dies $c'$, in combination with the movable pins F, arranged in front of said dies the sliding jaws D provided with pins $d^3$ and arranged in front of and in line with said pins and dies, the revolving cam disk D', provided with cam disk D', provided with cam projections $d^5$, $d^6$, the lever $f$, connected to movable pins F, the pins $f'$, the lever $f^3$, and the revolving cam $f^5$, substantially as described.

14. The eye dies $c'$, in combination with the movable pins F, the sliding jaws D, provided with movable pins $d^3$, the lifting levers E pivoted to the respective jaws and arranged to lift the said pins and the revolving cams $e'$, substantially as described.

15. The hook dies I, in combination with the sliding jaws I', provided with pins $i^3$ and recesses $i^8$, the sliding pin K, arranged in front of a hook-die and between it and said jaws the revolving cam disk J, provided with cam projections $j$, $j'$, the punch L and the forming or bending slot, $i^9$, substantially as described.

16. The hook dies I, in combination with the sliding jaws I', provided with pins $i^3$ and recesses $i^8$, the revolving cam disk J, provided with cam projections $j$ $j'$, the sliding pin K, arranged in front of a hook-die and between it and said jaws lever $k$, revolving cam K', punch L and the bending slot $i^9$, substantially as described.

17. In a machine for making and carding hooks and eyes, mechanism for forming the hooks and eyes, in combination with mechanism for delivering the same intermittently to a suitable carding strip, mechanism for feeding said strip intermittently through the machine and mechanism for stapling the said finished hooks and eyes to the said strip, substantially as described.

ALBERT D. MAJOR.

Witnesses:
C. P. MALCOLM,
WM. MCCRAE.